United States Patent [19]

Fukushima et al.

[11] Patent Number: 4,659,626
[45] Date of Patent: Apr. 21, 1987

[54] MAGNETIC RECORDING MEDIUM

[75] Inventors: Kiyoto Fukushima, Saku; Shigeru Takamatsu, Komoro; Eiji Kitaura, Saku, all of Japan

[73] Assignee: TDK Corporation, Tokyo, Japan

[21] Appl. No.: 750,446

[22] Filed: Jul. 1, 1985

[30] Foreign Application Priority Data

Jul. 2, 1984 [JP] Japan .................. 59-135226

[51] Int. Cl.$^4$ .............................. G11B 5/702
[52] U.S. Cl. ................ 428/425.9; 252/62.54; 477/128; 428/521; 428/522; 428/523; 428/694; 428/900
[58] Field of Search ............ 428/694, 900, 425.9, 428/522, 521, 523, 493; 427/128; 252/62.54; 360/134–136

[56] References Cited

U.S. PATENT DOCUMENTS 4,152,485  5/1979  Mizumura ................. 428/64
4,400,435  8/1983  Yoda ....................... 428/694
4,460,653  7/1984  Azegami .................... 428/694
4,529,661  7/1985  Ninomiya ................... 428/694

Primary Examiner—Ellis P. Robinson
Attorney, Agent, or Firm—Seidel, Gonda, Goldhammer & Abbott

[57] ABSTRACT

In a magnetic recording medium consisting of a base coated with a magnetic coating material, or a dispersion of magnetic particles in a resinous binder, the binder comprises a copolymer composed of vinyl chloride, a vinyl alkylcarboxylate, another monomer copolymerizable with vinyl chloride, and a saponified vinyl alkylcarboxylate and having an OH/CH absorption ratio according to the infrared absorption spectrum of 0.2 to 0.7, a polyurethane resin having in its molecule a —SO$_3$M group wherein M represents an alkali metal atom, and a polyurethane resin or polyester resin or both containing no —SO$_3$M group wherein M represents an alkali metal atom, and a polyisocyanate.

7 Claims, 2 Drawing Figures

MAGNETIC RECORDING MEDIUM

BACKGROUND OF THE INVENTION

This invention relats to a magnetic recording medium, and more specifically to a magnetic recording medium which exhibits good shelf stability and running performance in high temperature and humidity environments in addition to improved magnetic powder dispersion and surface properties of the magnetic coating film.

In general, a magnetic recording medium such as magnetic tape, etc. is made by coating a base of polyester film or the like with a magnetic coating material prepared by dispersing a magnetic powder, for example, finely divided $\gamma$-$Fe_2O_3$, in a high-molecular resinous binder. The properties of the magnetic coating film have much to do not only with the running performance and other physical properties of the tape but also with the magnetic powder dispersion and magnetic properties of the medium. The magnetic film properties, in turn, are largely dependent on the composition of, and the additives used in, the resinous binder. In view of these, many different resinous binder ingredients have hitherto been proposed. For instance, vinly chloride-vinyl acetate-vinyl alcohol copolymers have been widely used as a binder resin ingredient for magnetic tapes. This type of copolymers is characterized by relatively low cost, ready solubility in solvents, good compatibility with other resins, and affinity for magnetic particles on account of the hydroxyl group in the molecule which facilitates the dispersion of the particles. Additional advantages of the copolymers are excellent magnetic properties they contribute, including high degrees of orientation and maximum residual magnetic flux density.

The recent trend toward the use of finer magnetic particles has, however, made these resins not always satisfactory. Investigations have therefore been made about increasing the proportion of hydroxyl groups in the copolymers of the foregoing type. As a result, it has already been found that the dispersibility of magnetic particles is properly improved by introducing the OH groups until the OH/CH absorption ratio according to the infrared absorption spectrum reaches 0.7 or more. However, the copolymers with increased hydroxyl group contents have such high glass transition temperatures that they are difficult to process on the surface and hence the resulting magnetic layer after calendering can hardly be improved in surface quality. In an effort to eliminate this drawback, we have previously proposed to employ a copolymer composed of vinyl chloride, a vinyl alkylcarboxylate, another monomer copolymerizable and vinyl chloride, and a saponified vinyl alkylcarboxylate and having an OH/CH absorption ratio according to the infrared absorption spectrum of 0.2 to 0.7. The copolymer, with the proportion of the saponified ingredient kept rather small, is prevented from undergoing a boost in the glass transition point. Partial loss of the dispersibility of the magnetic powder due to the decrease in proportion of the saponified ingredient is made up for with the action of the monomer copolymerizable with vinyl chloride. Thus, improvements are achieved in orientation, maximum residual magnetic flux density, and other characteristics.

Nevertheless, singular use of the copolymer as a binder resin poses problems yet to be solved including inadequate bond strength and questionable storability and running performance of the resulting magnetic tapes in high-temperature high-humidity environments. For this reason the copolymer is blended with a rubbery binder ingredient to provide a binder for magnetic tapes. More recently, ultrafine magnetic particles have come into use, and accordingly the role the rubbery binder is now required to play is not morely to maintain the physical properties of the magnetic tape but, in addition, to improve the dispersibility of the magnetic particles. With this in view, an attempt was made to blend a polyurethane resin having in its molecule a $-SO_3M$ group wherein M represents an alkali metal atom with the above copolymer. It resulted in satisfactory magnetic particle dispersibility and excellent orientation, maximum residual magnetic flux density, and other magnetic properties. Also, improved surface properties and a striking improvement in the electromagnetic conversion characteristic of the calendered magnetic layer were observed. Still, it has been found that the polyurethane resin having a $-SO_3M$ group wherein M represents an alkali metal atom cannot give a magnetic tape with high reliability. The resin does not react readily with polyisocyanates and its $-SO_3M$ group content can have adverse effects upon the properties of the base film (including the elongation, tensive strength, and breaking strength), thus aggravating the physical characteristics (such as running durability, bond strength, and head abrasion) of the resulting magnetic tape. The present invention is directed to the solution of these problems concomitant with the use of a polyurethane resin having a $-SO_3M$ group in the molecule.

SUMMARY OF THE INVENTION

It has now been found that, in the manufacture of a magnetic recording medium, the physical properties of the product can be improved without decreasing the dispersibility of the magnetic particles when the binder of the composition described above is further mixed with a rubbery binder, or a polyurethane resin or polyester resin or both, which contain no $-SO_3M$ group in the molecule, and a polyisocyanate. Thus, the invention provides a magnetic recording medium which comprises a magnetic coating material, or a dispersion of magnetic particles in a resinous binder, and a base to which the dispersion is solidly applied, said resinous binder comprising a copolymer composed of vinyl chloride, a vinyl alkylcarboxylate, another monomer copolymerizable with vinyl chloride, and a saponified vinyl alkylcarboxylate and having an OH/CH absorption ratio according to the infrared absorption spectrum of 0.2 to 0.7, a polyurethane resin having in its molecule a $-SO_3M$ group wherein M represents an alkali metal atom, and a polyurethane resin or polyester resin or both containing no $-SO_3M$ group wherein M represents an alkali metal atom.

DETAILED DESCRIPTION

Figure 1:
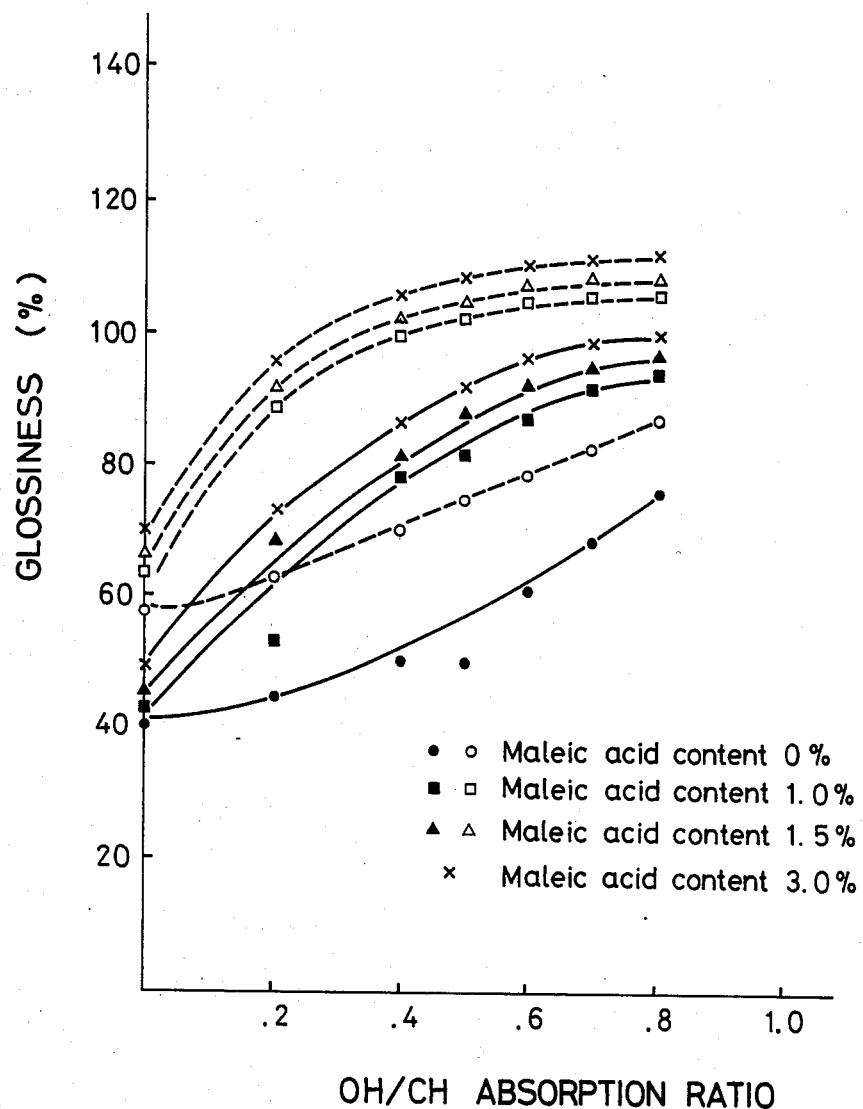
FIG. 1 is a graphic representation of the surface property (glossiness) of as-coated specimens of magnetic recording medium according to the invention.

The vinyl alkylcarboxylate and the saponified one as constituents of the vinyl chloride-vinyl alkylcarboxylate copolymer for use as a resinous binder ingredient under the invention may be vinyl acetate, vinyl propionate, vinyl Versatate, and their saponification products. Also, examples of the other monomers copolymerizable with vinyl chloride for use in the invention are maleic, fumaric, and methacrylic acids and their esters, and acrylic acid and its esters. On the basis of such a copolymer, the other ingredients are generally used in amounts by weight of: 50 to 90% of vinyl chloride, 5 to 40% of a vinyl alkylcarboxylate, 0.5 to 5.0% of the other monomer copolymerizable with vinyl chloride, and practically the remainder of a saponified vinyl alkylcarboxylate. The copolymer for use in the present invention may be prepared in a variety of ways. One method, for example, consists in saponifying a vinyl chloride-vinyl alkylcarboxylate copolymer, and then reacting the resultant with another monomer copolymerizable with vinyl chloride. For the present invention usable vinyl alkylcarboxylates are those having OH/CH absorption ratios according to the infrared absorption spectrum in the range of 0.2 to 0.7. In the expression OH/CH absorption ratio according to the infrared absorption spectrum as used herein, the OH absorption occurs at 3450 cm$^{-1}$ and the CH absorption at 2930 cm$^{-1}$, and the OH/CM means their intensity ratio.

The polyurethane resin having a —SO$_3$M group in the molecule will not contribute much to the improvement in dispersibility of magnetic particles if the —SO$_3$M group proportion is too small but will cure inadequately with a polyisocyanate if the proportion is excessive. Generally, a polyurethane resin in which the —SO$_3$M group proportion ranges from about 10 to 1000 g equivalent/10$^4$ g gives good result. If the proportion is less than 10 g equivalent/10$^4$ g, the resin imparts only limited dispersibility whereas a proportion of more than 1000 g equivalent/10$^4$ g the resin will no longer react with the polyisocyanate as a curing agent, with unfavorable effects upon the physical properties of the resulting coating film. The amount of the —SO$_3$M-containing polyurethane resin to be used is in the range of 10 to 70% by weight, preferably 30 to 60% by weight on the basis of the total weight of resins in the binder.

The —SO$_3$M group-containing polyurethane resin to be used in the invention is prepared by reaction of a polyhydroxy compound containing SO$_3$M group with a polyisocyanate. For this purpose is used a polyhydroxy compound wherein all or part of the sulfonic acids has been converted to a metal salt. A polyester polyol comprising a carboxylic acid ingredient, a glycol ingredient, and a dicarboxylic acid ingredient and containing a metal sulfonate group may also be employed. The metal sulfonate group is contained in the carboxylic acid or dicarboxylic acid or both. Examples of dicarboxylic and carboxylic acids are terephthalic, isophthalic, orthophthalic, aromatic dicarboxylic, aromatic oxycarboxylic, succinic, adipic, azelaic, and sebacic acids. The glycol ingredient may be any of ethylene glycol, propylene glycol, 1,3-propane, 1,4-butanediol, 1,5-pentanediol, neopentyl glycol, diethylene glycol, 1,6-hexanediol, dipropylene glycol, 2,2,4-trimethyl-1,3-pentanediol, 1,4-cyclohexanedimethanol, ethylene oxide adduct and propylene oxide adduct of bisphenol, ethylene oxide adduct and propylene oxide adduct of hydrogenated bisphenol, polyethylene glycol, polypropylene glycol, and polytetraglycol. It may be used in combination with a triol or tetrol such as trimethylolethane, trimethylolpropane, glycerin, or pentaerythritol. The polyhydroxy compounds containing a metal sulfonate group may be employed singly or as a mixture of two or more. Among the polyisocyanates useful in forming the polyurethane resin for the invention are 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 1,3-naphthalene diisocyanate, 4,4'-diphenylene diphenyl ether, p-xylylene diisocyanate, m-xylylene diisocyanate, 1,3-diisocyanato methyl cyclohexane, 1,4-diisocyanato methyl cyclohexane, 4,4'-diisocyanato dicyclohexane, 4,4'-diisocyanato dicyclohexylmethane, and isophorone diisocyanate. The polyurethane resin is obtained by reacting a polyhydroxy compound with a polyisocyanate in the usual manner in a solvent or without the use of any solvent. The molecular weight of such a polyurethane resin desirably ranges from 5,000 to 100,000.

The rubbery binder ingredient for use in the invention which is utterly free from SO$_3$M group is a polyurethane resin or polyester resin or both. The ingredient is used in an amount of 10 to 70% by weight, preferably 20 to 60% by weight, on the basis of the total resin weight in the binder. Typical of the polyurethane resins usable for the present invention are those marketed under the trade designations "Nippollan 2304", "-2301", "-3022", "-5032", "-5033", and "Paraprene 22S" by Nippon Polyurethane Industry Co.; "Estane 5702", "-5703", "-5711", "-5712", and "-5717" by B. F. Goodrich Chemical Co. of the U.S.; "Crisvon 4216", "-4407", and "-7209" by Dainippon Ink & Chemical Co., "EA-254", "-255", "-256", "Praccel 205", "-208", "-212", "-230", "-240", "-303", "-305", "-308", "-320", and "-330" by Daicel Chemical Industries, Ltd.; "T-1040" and "E-550" by Takeda Chemical Industries, Ltd.; and "Pandex T-5000", "-T-5009", "-T-5010", "-T-5102", "-T-5205", and "-5260HT" by Dainippon Ink. Examples of polyester resins which may be used as well as the urethane resins in the present invention are those tradenamed "Desmophen 2200", "-1700", "-1100", "-800", and "-650" by Bayer Co.; "Nippollan 1004" and "-4032" by Nippon Polyurethane; and "Vylon 200", "-300", and "-500" by Toyobo Co. The amount of such a polyester resin to be used may be substantially the same as that of the polyurethane resin. The polyester resin may be used as mixed with the polyurethane resin, in which cast the amount to be used is again substantially the same as that of the latter alone.

Useful polyisocyanate type curing agent for the invention include bifunctional isocyanates, such as tolylene diisocyanate, diphenylmethane diisocyanate, and hexane diisocyanate, and trifunctional isocyanates. Whatever polyisocyanate usable as a curing agent may be employed. The polyisocyanate for use in the present invention is added in an amount of 5 to 30%, preferably 10 to 25%, on the basis of the total resin weight. Commercially available polyisocyanate compounds usable to this end are, for example, Nippon Polyurethane's products tradenamed "Coronate L", "-HL", and "-2036".

The relative proportions of the four resinous binder ingredients to be used in preparing the magnetic coating material of the invention are as follows. Usually, on the basis of the total resin weight, the copolymer accounts for 20 to 80%, the —SO$_3$M-containing polyurethane resin for 10 to 70%, the rubbery binder ingredient for 10 to 70%, and the polyisocyanate curing agent for 5 to 30%, all by weight. Preferably, the copolymer accounts for 30 to 70%, the SO$_3$M-containing polyurethane resin for 30 to 60%, the rubbery binder ingredient for 20 to 60%, and the polyisocyanate curing agent for 10 to 25%, all by weight.

The magnetic powder to be employed does not characterize the present invention; it may be any magnetic particles, for example, of γ-iron oxide, Co-containing γ-iron oxide, or ferroalloy, in common use for the manufacture of magnetic recording media.

When the binder of the afore-described composition was used in the coating layer of the magnetic recording medium according to the invention, the shortcomings inherent to conventional binders were considerably remedied and improvements were achieved in dispersibility and surface properties and in the reactivity with the polyisocyanate. Moreover, a markedly advantageous effect was attained upon the running reliability of the medium in hot-and-humid and low-temperature environments.

The present invention is illustrated by the following examples and comparative examples.

COMPARATIVE EXAMPLE 1

| | |
|---|---|
| Vinyl chloride-vinyl acetate copolymer (OH/CH absorption ratios = 0, 0.3, 0.5, & 0.9) | 20 g |
| Polyurethane resin (—SO$_3$Na-containing) (—SO$_3$Na content = 10–1000 g equiv/10$^4$ g) | 20 |
| Dispersant | 5 |
| Lubricant | 5 |
| Magnetic powder (Co-containing γ-Fe$_2$O$_3$) | 200 |
| Polyisocyanate | 10 |

COMPARATIVE EXAMPLE 2

| | |
|---|---|
| Vinyl chloride-vinyl acetate copolymer (Maleic acid content = 0–3.0%) | 20 g |
| Polyurethane resin | 20 |
| Dispersant | 5 |
| Lubricant | 5 |
| Magnetic powder (Co-containing γ-Fe$_2$O$_3$) | 200 |
| Polyisocyanate | 10 |

COMPARATIVE EXAMPLE 3

| | |
|---|---|
| Vinyl chloride-vinyl acetate copolymer (OH/CH absorption ratios = 0, 0.2, 0.4, 0.5, 0.6, 0.7, 0.8) | 20 g |
| Polyurethane resin | 20 |
| Dispersant | 5 |
| Lubricant | 5 |
| Magnetic powder (Co-containing γ-Fe$_2$O$_3$) | 200 |
| Polyisocyanate | 10 |

COMPARATIVE EXAMPLE 4

| | |
|---|---|
| Vinyl chloride-vinyl acetate copolymer (Maleic acid content = 0–3.0%) (OH/CH absorption ratio = 0, 0.2, 0.4, 0.5, 0.6, 0.7, 0.8) | 20 g |
| Polyurethane resin (SO$_3$Na-containing) (SO$_3$Na content = 10–1000 g equiv/10$^4$ g) | 20 |
| Dispersant | 5 |
| Lubricant | 5 |
| Magnetic powder | 200 |
| Polyisocyanate | 10 |

EXAMPLE 1

| | |
|---|---|
| Vinyl chloride-vinyl acetate copolymer* (Maleic acid content = 0–3.0%) (OH/CH absorption ratio = 0, 0.2, 0.4, 0.5, 0.6, 0.7, 0.8) | 20 g |
| Polyurethane resin (SO$_3$Na-containing) (SO$_3$Na content = 10–1000 g equiv/10$^4$ g) | 10 |
| Polyurethane resin (SO$_3$Na-free)** | 10 |
| Dispersant | 5 |
| Lubricant | 5 |
| Magnetic powder (Co-containing γ-Fe$_2$O$_3$) | 200 |
| Polyisocyanate | 10 |

Notes:
*A quaternary copolymer containing a saponified ingredient represented by one of the absorption ratios in the parentheses and also a monomer mentioned in the other set of parentheses.
**M in the SO$_3$M group represents an alkali metal atom.

EXAMPLE 2

| | |
|---|---|
| Vinyl chloride-vinyl propionate copolymer (Fumaric acid content = 0–3.0%) (OH/CH absorption ratio = 0, 0.2, 0.4, 0.5, 0.6, 0.7, 0.8) | 20 g |
| Polyurethane resin (SO$_3$K-containing) (SO$_3$K content = 10–1000 g equiv/10$^4$ g) | 10 g |
| Polyurethane resin (SO$_3$M-free)** | 10 |
| Dispersant | 5 |
| Lubricant | 5 |
| Magnetic powder | 200 |
| Polyisocyanate | 10 |

**M in the SO$_3$M group represents an alkali metal atom.

EXAMPLE 3

| | |
|---|---|
| Vinyl chloride-vinyl propionate copolymer (Methacrylic acid content = 0–3.0%) (OH/CH absorption ratio = 0, 0.2, 0.4, 0.5, 0.6, 0.7, 0.8) | 20 g |
| Polyurethane resin (SO$_3$Na-containing) (SO$_3$Na content = 10–1000 g equiv/10$^4$ g) | 10 |
| Polyurethane resin (SO$_3$M-free)** | 10 |
| Dispersant | 5 |
| Lubricant | 5 |
| Magnetic powder (Co-containing γ-Fe$_2$O$_3$) | 200 |
| Polyisocyanate | 10 |

Notes:
*A quaternary copolymer containing a saponified ingredient represented by one of the absorption ratios in the parentheses and also a monomer mentioned in the other set of parentheses.
**M in the SO$_3$M group represents an alkali metal atom.

Each composition of the formulations given in the above comparative examples and examples of the invention was mixed with a suitable amount of a solvent in a ball mill for 48 hours. The mixture was applied to a 14 μm-thick polyester film to form a layer 5.0 μm thick (when dry) thereon. The coated film was slitted into ribbons about 12.65 mm (½ in.) wide as magnetic tapes.

Figure 2:
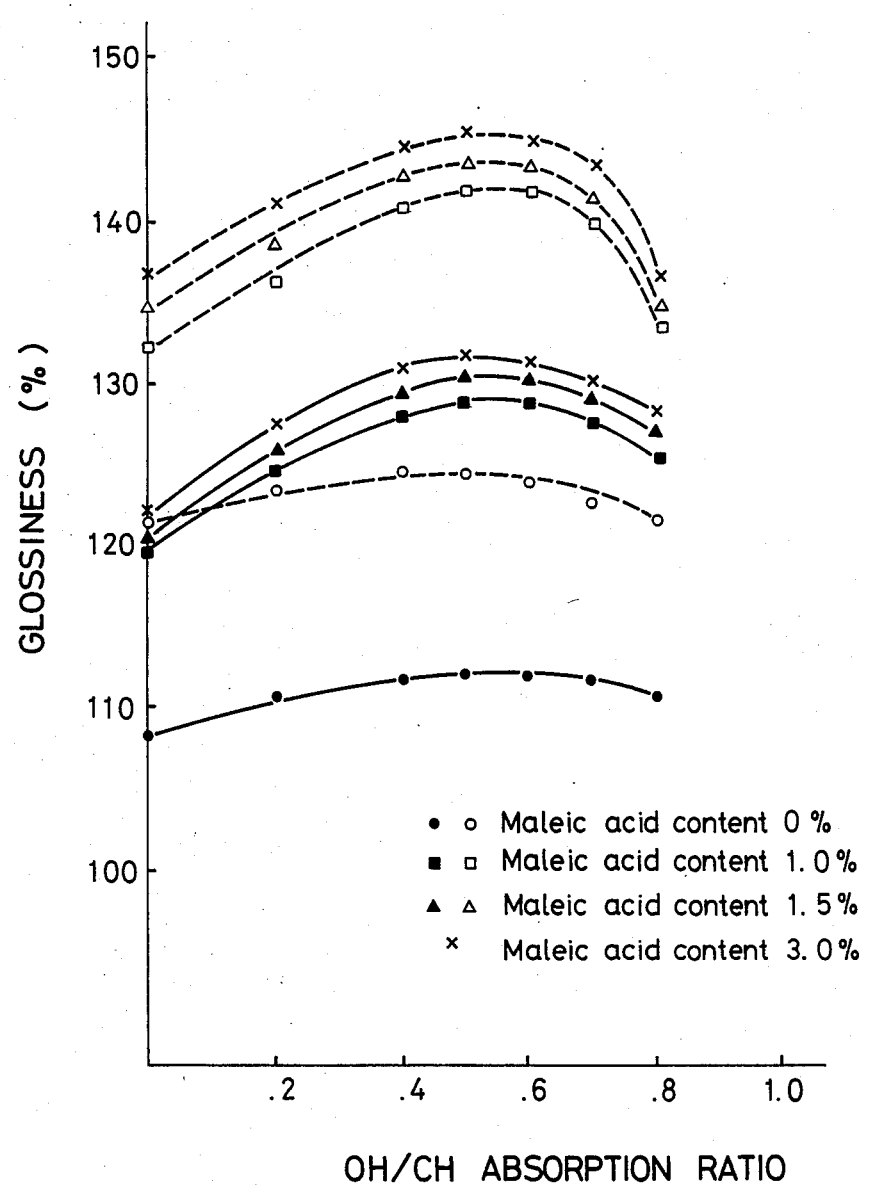
FIG. 2 is a graphic representation of the surface property (glossiness) of the specimens after calendering.

FIGS. 1 and 2 graphically represent the surface properties of as-coated and calendered tapes, respectively, of Example 1 and Comparative Example 3.

It is obvious from FIGS. 1 and 2 that the coating layer containing both of the monomer (maleic acid) and SO$_3$M group (wherein M represents an alkali metal atom) as resinous ingredients is glossier than the layer that contains the SO$_3$M group (wherein M represents an alkali metal atom) but not the monomer (maleic acid), or vice versa, or the layer that contains neither of them. Also, as regards the OH/CH absorption ratio, FIGS. 1 and 2 indicate that the gloss of the as-coated surface increases as the OH/CH absorption ratio rises. The same is true of the calendered coating surface, but because of the glass transition point the gloss declines once the OH/CH absorption ratio exceeds 0.5. With the binder of the invention whose OH/CH absorption ratio is within the range of 0.2 to 0.7, it is clear that the gloss of the as-coated surface and that of the finished surface are both excellent. Similar favorable results were obtained with the tapes using the formulations of Examples 2 and 3.

In order to clarify the advantageous effects of the invention upon the magnetic recording medium, the characteristic values are given in Table 1.

TABLE 1

| Example | Br (G) | Br/Bm (%) | y-S/N* (dB) | Envelope (%) | Running durabty | Head wear ($\mu$m)** | Solvent res.*** |
|---------|--------|-----------|-------------|--------------|-----------------|----------------------|-----------------|
| Comparative: | | | | | | | |
| 1 | 1100 | 73 | 1.7 | 22.3 | C | 6 | C |
| 2 | 1120 | 76 | 2.0 | 23.0 | D | 7 | B |
| 3 | 1020 | 70 | 1.5 | 23.0 | C | 5 | B |
| 4 | 1250 | 82 | 2.8 | 12.0 | B | 6 | C |
| This Invention: | | | | | | | |
| 1 | 1250 | 83 | 2.9 | 11.8 | A | 4 | A |
| 2 | 1240 | 81 | 2.8 | 12.5 | A | 4 | A |
| 3 | 1240 | 82 | 2.8 | 12.3 | A | 4 | A |

Notes:
*The S/N value as measured on the basis of a TDK standard tape on a video taperecorder manufactured by Matsushita Electric Industrial Co.
**The wear of head determined during the running durability test.
***The strength of the magnetic coating film against organic solvents.

As can be seen from Table 1, the binder according to the present invention reduces the wear of the head and attains improved reactivity with the polyisocyanate without adversely affecting the high dispersibility of the —$SO_3M$ group (wherein M represents an alkali metal atom).

What is claimed is:

1. A magnetic recording medium which comprises a dispersion of magnetic particles in a resinous binder, and a base to which the dispersion is solidly applied, said resinous binder comprising a copolymer composed of vinyl chloride, a vinyl alkylcarboxylate, another monomer copolymerizable with vinyl chloride, and a saponified vinyl alkylcarboxylate and having an OH/CH absorption ratio according to the infrared absorption spectrum of 0.2 to 0.7, a polyurethane resin having in its molecule a —$SO_3M$ group in the range of about 10 to 1000 g equivalent $10^4$ g and wherein M represents an alkali metal atom, and a rubbery binder ingredient comprising polyurethane resin or polyester resin or both containing no —$SO_3M$ group wherein M represents an alkali metal atom, and a polyisocyanate.

2. A magnetic recording medium according to claim 1 wherein the vinyl alkylcarboxylate is vinyl acetate.

3. A magnetic recording medium according to claim 1 wherein the vinyl alkylcarboxylate is vinyl propionate.

4. A magnetic recording medium according to claim 1 wherein another monomer copolymerizable with vinyl chloride is maleic acid, fumaric acid, acrylic acid, methacrylic acid, an ester thereof, or a combination thereof.

5. A magnetic recording medium according to any one of claims 1 to 4 wherein the copolymer comprises, all by weight on the basis thereof, 50 to 90% of vinyl chloride, 5 to 40% of a vinyl alkylcarboxylate, 0.5 to 5.0% of another monomer copolymerizable with vinyl chloride, and the remainder substantially of a saponified vinyl alkylcarboxylate.

6. A medium according to any one of claims 1 to 4 wherein, on the basis of the total resin weight in the resinous binder, the copolymer accounts for 20 to 80%, the $SO_3M$-containing polyurethane resin for 10 to 70%, the rubbery binder ingredient for 10 to 70%, and the polyisocyanate curing agent for 5 to 30%, all by weight.

7. A medium according to claim 6 wherein said copolymer accounts for 30 to 70%, said $SO_3M$-containing polyurethane resin for 30 to 60%, said rubbery binder ingredients for 20 to 60%, and said polyisocyanate curing agent for 10 to 25%, all by weight.

* * * * *